United States Patent [19]

Feldshtein et al.

[11] 4,272,033
[45] Jun. 9, 1981

[54] DEVICE FOR FORMING TAPS WHEN WINDING ELECTRICAL COILS

[76] Inventors: Isaak Y. Feldshtein, ulitsa Rymarskaya, 23, kv. 5; Valery S. Epifanov, prospekt Traktorostroitelei, 65 V, kv. 22; Vladimir N. Olefirenko, ulitsa Roberta Eidemana, 5, kv. 1; Jury I. Karelov, ulitsa Geroev Truda, 26, kv. 74; Alexandr A. Boyarsky, ulitsa Geroev Truda, 47a, kv. 57; Alexandr N. Pashkov, pereulok Rubezhansky, 24, all of, Kharkov, U.S.S.R.

[21] Appl. No.: 27,073

[22] Filed: Apr. 4, 1979

[51] Int. Cl.³ .......................................... H02K 15/09
[52] U.S. Cl. .................................. 242/7.05 B; 29/598; 29/732
[58] Field of Search ............ 242/1.1 R, 1.1 A, 7.05 B, 242/7.05 A; 29/597, 596, 598, 605, 732

[56] References Cited

U.S. PATENT DOCUMENTS

| | | | |
|---|---|---|---|
| 2,627,379 | 2/1953 | Moore | 242/7.05 B |
| 2,847,170 | 8/1958 | Lill et al. | 242/1.1 R |
| 3,249,311 | 5/1966 | Korthof et al. | 242/1.1 R |
| 3,636,621 | 1/1972 | Dammar | 29/597 |
| 3,812,577 | 5/1974 | Compton et al. | 242/7.05 B |
| 3,857,172 | 12/1974 | George et al. | 242/7.05 B |

FOREIGN PATENT DOCUMENTS 1082666  6/1960  Fed. Rep. of Germany ....... 242/1.1 R

*Primary Examiner*—Billy S. Taylor
*Attorney, Agent, or Firm*—Holman & Stern

[57] ABSTRACT

A hook for engaging a wire, holding it outside of the winding zone and releasing the same prior to completing the winding of the next coil, is movably mounted on a drive shaft, is connected thereto through a spring and has a stop near the shaft. The shaft is mounted in a housing movable with respect to the wire guide of the machine for winding the coils and is provided with a projection rigidly secured thereon for interaction with the stop of the hook. The mobility of the housing can be provided by mounting it in hinges on the machine bed or on a telescopic shaft, in which case the housing is controlled by a cam mechanism under action of which it moves the hook to the winding zone and removes it therefrom. During the operation the hook permanently rotates on the shaft at a predetermined speed and is periodically introduced into the winding zone for forming the taps.

3 Claims, 9 Drawing Figures

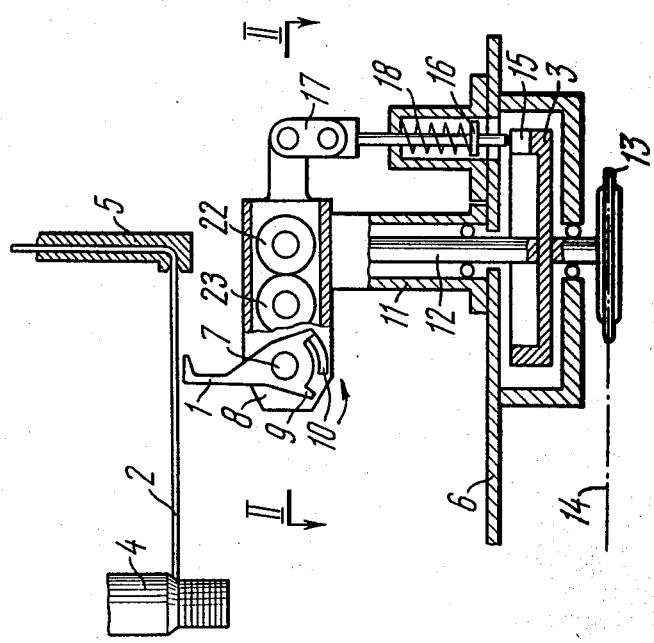
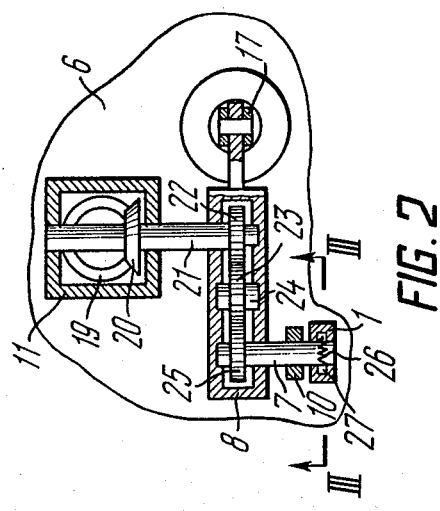
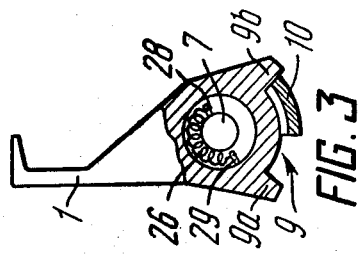

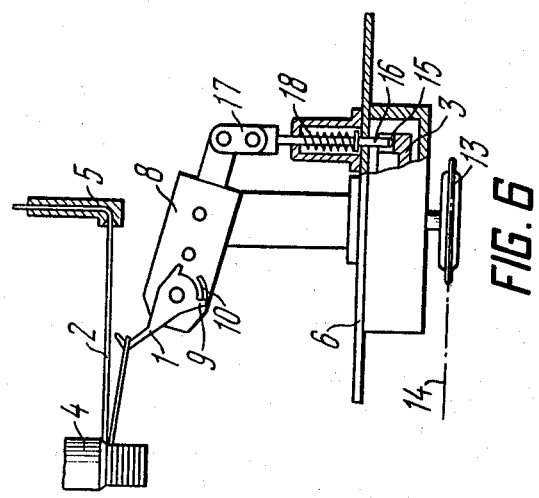
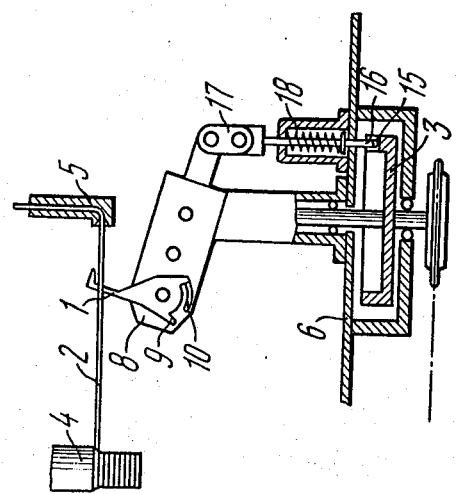

DEVICE FOR FORMING TAPS WHEN WINDING ELECTRICAL COILS

FIELD OF THE INVENTION

The present invention relates to production of electrical machines and, more particularly, the invention relates to devices for forming taps when winding electrical coils.

The invention may successfully be used in machines for winding coil groups for electrical machines. Such machines, like the machine described in USSR Inventor's Certificate No. 450,288, which further will be referred to as said machines, comprise essentially a winding head with a wire guide mounted on the machine bed, a multistage template for winding a group of coils, a mechanism for preventing the template from rotating, a mechanism for forming taps, a mechanism for changeover of the coils from one winding stage to another, and a drive.

The winding of the coil groups is effected as follows. First, one coil is wound on a stationary template using a rotary wire guide, then all the other coils are wound in succession at a reduced speed but continuously. At the moment of completion of winding of a regular coil, the tap forming mechanism engages the wire (a hook is usually used for this purpose), holds this wire outside of winding zone and releases it prior to completing the winding of the next coil.

Thus, the invention relates to device for forming taps when winding electrical coils in said machine.

BACKGROUND OF THE INVENTION

Known in the art is a device for forming taps in a machine for winding starters of electrical machines disclosed in U.S. Pat. No. 2,624,518, which comprises pins for catching the wire connected to the ram of an operating cylinder through coupling rods. The operating cylinder is controlled by valves whose operation is controlled by switches in the control circuit of the winding machine.

In the known design, the levers and rods have a length exceeding that required for performing the working movements when engaging the wire and holding it outside of the winding zone and, therefore, they comprise a comparatively high mass which results in excessive inertia of the operating members.

As a result, the time of operation of the valves is increased and this causes an increase in the time of operation of the device and, in turn, limits the winding machine efficiency.

From the specification to USSR Inventior's Certificate No. 494826 a device is known, which is intended for forming taps during the winding of electrical coils and is free from the above disadvantages. The device comprises a movable hook for catching the wire, holding it outside of the winding zone and releasing it prior to completing the winding of the next coil, said hook being coupled to a source of mechanical power; and a cam for controlling the hook driven by the same source.

In this device the hook is moved into the winding zone and is removed therefrom by a ram of a pneumatic cylinder. This ram is also connected to the hook control cam, which releases the wire from said hook during its movement into the winding zone to secure the next portion of the wire forming the tap.

In this device, like in the previously described one, the speed of motion of the hook into the winding zone and from this zone depends on the speed of the cylinder ram and operation of the valves controlling the pneumatic cylinder. The specified speed of operation of the compressed air driven mechanisms, in contrast to mechanically driven mechanisms, depends on the pressure in the air supply line and the ambient temperature; therefore, it is necessary to provide a considerable time reserve for the operation of forming the taps.

ESSENCE OF THE INVENTION

An object of the present invention is to provide a device for forming taps when winding electrical coils, which would ensure a constant operating speed of its members.

Another object of the invention is to provide a device for forming taps when winding electrical coils, which would ensure the efficiency of the machine for winding the electrical coils.

Still another object of the invention is to provide a device for forming taps when winding electrical coils in said machine, which would make it possible to increase the rate of switching the coils from one winding step to another with reliable removal of the tap from the winding zone.

These and other objects of the invention, which will be clear from the specification, are attained due to the fact that the hook for catching the wire, holding it outside of the winding zone and releasing it prior to completing the winding of the next coil is movably mounted on a drive shaft, coupled therewith through an elastic member and has a stop near this shaft, while the shaft is mounted in a housing movable with respect to the wire guide of the machine and is provided with a projection rigidly fitted thereon for interaction with the hook stop. The housing is hingedly mounted on the bed of the coil winding machine and includes a spring-loaded pusher hingedly connected thereto and brought in contact with the hook controlling cam. The device may also comprise a telescopic drive shaft carrying a casing, which includes a spring-loaded pusher rigidly secured thereto and brought in contact with the cam.

Such a design makes it possible to catch the wire, hold it outside of the winding zone and release it prior to the completion of the winding of the next coil at a constant speed in each cycle of forming the tap, because the hook rotates at a specified constant speed and, under the action of the cam, is led into the winding zone and is withdrawn therefrom. After the hook has caught the wire, its speed under the force of tension of the wire is increased and it turns about the hook carrying shaft at this speed until it is stopped by the stop member. This makes unnecessary the engagement of the tap by the wire during the subsequent formation of the turns by the rotating wire guide.

In this case, the inertia of the device is minimized and the external factors, such as ambient temperature and disadvantages inherent in the pneumatic and hydraulic drives, are eliminated.

According to one aspect of the invention, the movement of the hook into the winding zone and withdrawal of the same from this zone, can be effected by hingedly mounting the casing on the machine bed and by coupling it to the cam through a spring-loaded pusher hingedly connected to this casing.

According to the other embodiment of the invention, the casing can be mounted on a telescopic drive shaft and connected to the cam through a spring-loaded pusher rigidly coupled to this casing.

BRIEF DESCRIPTION OF DRAWINGS

The objects and advantages of the invention will be apparent from the following detailed description of some embodiments thereof with reference to the accompanying drawings, in which:

FIG. 1 is a general view of the device according to the invention, partially in section in a vertical plane;

FIG. 2 is a sectional view taken along the line II—II in FIG. 1;

FIG. 3 is a general view of the hook with a partial sectional view along the line III—III in FIG. 2;

FIGS. 5, 6 and 7 show the positions of the device according to the invention, at different steps of forming the taps;

DETAILED DESCRIPTION OF PREFERRED EMBODIMENTS

Figure 4:
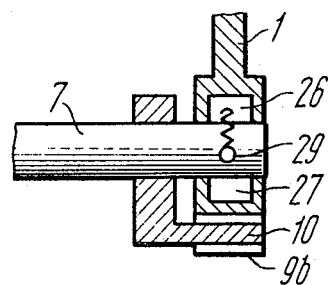
FIG. 4 shows the hook and shaft in an assembled unit, a sectional view taken along the vertical plane in the shaft axis.

As shown in FIG. 1, the device for forming taps when winding electrical coils includes a movable hook 1 for catching a wire 2, holding it outside of the winding zone and releasing the wire prior to completing the winding of the next coil, connected to a source of mechanical power (not shown), and a cam 3 for controlling the hook 1 or for introducing it into the winding zone and for removing it therefrom. The device for forming the taps is illustrated by an example of its use in said winding machine; however, in order to simplify the picture, in the drawings a schematic diagram is given only of the template 4, wire guide 5 and bed 6 of the machine.

According to the invention, the hook 1 is movably mounted on a drive shaft 7 installed in a casing 8, which casing is capable of moving with respect to the wire guide 5 of the machine. The hook is coupled with this shaft through an elastic member, which will be described further, and has a stop 9 near the shaft 7. A projection 10 is rigidly mounted on the shaft 7, said projection 10 interacting with the stop 9. Referring again to FIG. 1, we see that the device according to the invention is mounted on the machine 6 and includes a casing 8 and a unit for imparting motion to this casing or a vertical upright 11, on which the casing 8 is hingedly mounted. The casing 8 and its connection with the upright 11 will be described in detail when considering FIG. 2. As shown in FIG. 1, the upright 11 is hollow and accommodates a shaft 12 coupled to a source of mechanical power or the machine drive (not shown) through a chain sprocket 13 secured on the lower end of the shaft 12 and a chain 14 enveloping and engaging the sprocket 13. Mounted on the shaft 12 is a cam 3 made in the form of a disk with a recess 15. The device according to the invention has a pusher 16 hingedly connected to the casing 8 by means of a link 17 and is permanently pressed to the working surface of the cam 3 by a spring 18, as shown in the drawing.

In FIG. 2 a gear wheel 19 is mounted on the upper end of the shaft 12, which is not seen in FIG. 2, and engages a gear wheel 20 on a shaft 21. The motion from the shaft 12 to the shaft 7 carrying the hook 1 is transmitted through the shaft 21, the gear wheels 19 and 20 and through a gear transmission including a gear wheel 22 mounted on the shaft 21, a gear wheel 23 on a shaft 24 and a gear wheel 25 on the shaft 7, the shafts 21 and 24 being also installed in the casing 8.

As mentioned above, the hook 1 is movably mounted on the drive shaft 7 and is coupled therewith through an elastic member in the form of a spring 26 (FIG. 2), for which purpose the body of the hook 1, restricted by the surface of the hole into which the shaft is inserted, is provided with a groove 27. Laid into the groove 27 (FIGS. 3 and 4) is a spring 26 whose one end is connected to the shaft 7 through a pin 28 and whose other end is connected to the hook 1 through a ring 29.

In this embodiment of the invention the stop 9 (FIGS. 3-4) is formed by a recess or projections 9a and 9b, between which the projection 10 is located. The spring 26 usually presses the projection 9b to the front face of the projection 10 provided that the arrow in FIG. 1 shows the direction of rotation of the shaft 7 and the associated projection 10. It is clear that in this case the spring is contracted, for the feedback of the pins 28 and 29 with the shaft 7 and hook 1 an expansion of the spring is necessary. The spring 26 presses the projection 9b to the front face of the projection 10 with a force, which is overcome during the engagement of the hook 1 with the wire 2 so that the hook 1 will rotate about the shaft 7 up to the rest of its projection 9a against the rear face of the projection 10.

The taps are formed in the following way.

During the winding of the coil groups the hook 1 constantly rotates on the shaft 7 in the direction shown by an arrow in FIG. 1. The hook 1 is driven by a source of mechanical power (not shown) through the chain 14, sprocket 13, vertical shaft 12, gear wheels 19 and 20 and then through the gear wheels 22, 23 and 25 on the shafts 21, 24 and 7 respectively.

The speed of the hook 1 is such that to the moment of completing the winding of the coil the hook 1 is directed upwards, i.e. in the direction of the wire 2. It should be noted that the hook 1, during the winding of the coil, rotates outside of the winding zone and does not interfere with the motion of the wire 2 when forming the turns by means of the rotating wire guide 5.

It should be also noted that said winding machine employs a multistage template, which in fact is identical to that described in U.S. Pat. No. 3,973,601, one stage of the template being shown in the drawings for simplicity.

The cam 3 mounted on the shaft 12 rotates permanently together with the hook 1. When the winding of the coil has been completed, the cam 3 occupies a position in which the recess 15 is coincident with the pusher 16, which enters this recess under the force of the spring 18 raising the end of the casing 8 with the hook 1 directed towards the winding zone.

It is clear that during the rotation of the casing 8 about the shaft 21, which in this case is an axis of the hinge joint, the gear wheels 23 and 25 rotate faster and the hook 1 is introduced into the winding zone earlier compared to the case, where such acceleration of the gear wheels 23 and 25 does not occur; therefore, this should be taken into account when calculating the speeds.

Figure 7:
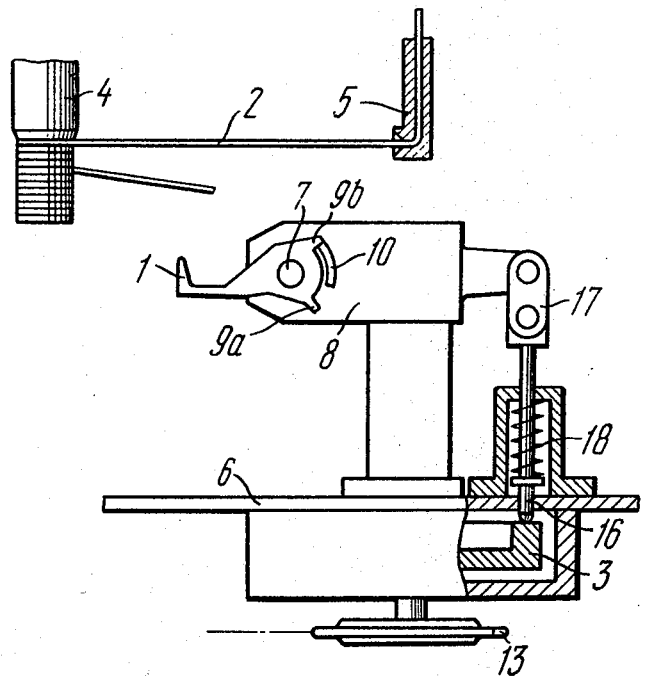

As mentioned above, the hook 1 through its projection 9b is pressed against the projection 10 by the spring 26. After the cam 3 has operated, the casing 8 rotates about the shaft 21, and the hook 1 occupies a position shown in FIG. 5. During further rotation of the wire guide 5 the hook 1 catches the wire 2, which turns it in the direction shown by an arrow in FIG. 1. The hook 1 is turned to the rest of its projection 9a against the projection 10 and during this time the hook displaces the tap beyond the winding zone (FIG. 6) without interfering with the step of winding a regular coil since the wound turns are shifted along the template 4 downwards, while the wire guide 5 continues to form the turns by performing circular motion along the same path as before. The hook 1 is moved by the force of tension of the wire until the projection 9a butts against the rear face of the projection 10. Then the hook 1 releases the tap or disengages it so that the casing 8 acted on by the pusher 18 leaves the recess 15 during the further rotation of the cam 3 on the shaft 12. At the same time, the hook 1, having been released from the action of the wire tension, returns to its initial position, i.e. the projection 9b butts against the front face of the projection 10 under the action of the spring 26 as shown in FIG. 7.

After that, from the moment of completion of the winding of a regular winding and to the moment of forming the next tap, the device according to the invention occupies a position shown in FIG. 1, and the process of forming the tap is repeated, as described above.

Figure 8:
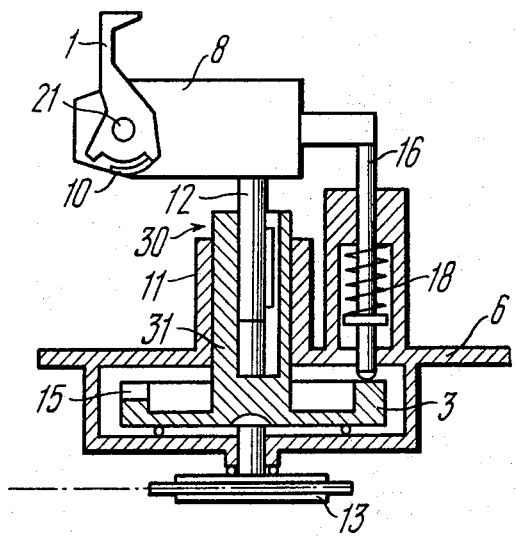
FIG. 8 is a general view of another embodiment of the invention with a partial section through the vertical plane.

FIG. 8 shows another embodiment of the invention, in which the unit imparting motion to the casing 8 comprises a drive telescopic shaft 30 mounted in the upright 11. The shaft 30 includes a vertical portion 31 whose lower end carries a sprocket 13, while in the upper end there is made a blind axial passage, into which is inserted a shaft portion designated as 12, because it in fact is identical to the shaft 12 described as a component of the embodiment of the invention shown in FIGS. 1 to 7. In order to prevent axial rotation of the portion 12 of the shaft, it is provided with a key, which, as clear to those skilled in the art, is inserted into the longitudinal slot made in the portion 12 so as to form a telescopic pair. As for the other members of the device according to the invention, they are substantially the same; however, it should be noted that in this embodiment of the invention the hook 1 and projection 10 are on the shaft 21 since the rise of the casing 8 on the telescopic shaft 30 is sufficient for introducing the hook 1 into the winding zone. It is obvious that in this case the gear ratio of the gear wheels 19 and 20 will be such that they will provide a required speed of the hook 1. In this embodiment of the invention it is necessary that the pusher 16 is rigidly connected to the casing 8, as shown in FIG. 8.

Furthermore, in contrast to the embodiment shown in FIGS. 1 to 7, where the hook 1 is introduced into the winding zone during the motion of the pusher 16 downwards, i.e. when it enters the recess 15, in the present embodiment the cam 3 has a projection for introducing the hook 1 into the winding zone.

During the operation the pusher 16, when it is coincident with the projection, overcomes the force of the spring 18, moves upwards and raises the casing 8 so that, on introducing the hook 1 into the winding zone or, on the contrary, entering the recess or, in the given case, moving the projection from the zone of location of the pusher 16, the latter moves downwards thus lowering the casing 8 and removing the hook 1 from the winding zone. In the other aspects the operation of the device according to the present embodiment is identical to the operation of the device described previously and shown in FIGS. 1 to 7.

Figure 9:
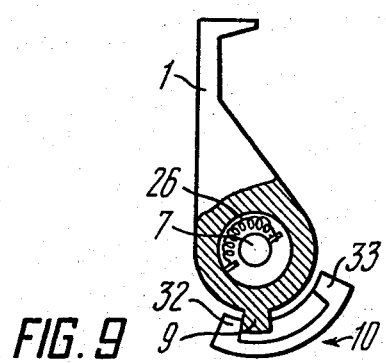
FIG. 9 is another embodiment of the hook and projection on the hook carrying shaft.

FIG. 9 shows an alternative to stops 9a and 9b interacting with projection 10. Namely, stop 9 is a projection on hook 1 which interacts in the same manner as before with stops 32 and 33 on projection 10.

What is claimed is:

1. A device for forming taps when winding electrical wire into coils in a winding zone of a coil winding machine having a machine bed and a coil wire guide, said device comprising:
    a casing movable with respect to the wire guide of the machine;
    drive shaft means mounted on said casing for rotation relative to said casing;
    a projection rigidly secured on said drive shaft means;
    hook means for catching the wire, holding it outside of the winding zone and releasing it prior to completing the winding of the next coil, said hook means being rotatably mounted on said drive shaft means and having stop means for interacting with said projection during the rotation of the hook means about said drive shaft means;
    elastic member means connected to said drive shaft means and said hook for transmitting rotary motion from said drive shaft means to said hook means;
    cyclicly movable means including cam means for imparting motion to said casing during a portion of each complete rotation of said drive shaft means, said motion being such that said hook means is projected into said winding zone; and
    common drive means for both moving said cam means and rotating said drive shaft means.

2. A device as claimed in claim 1 wherein said cyclicly movable means includes a vertical upright on which said casing is hingedly mounted and a spring-loaded pusher hingedly connect to said casing wherein said cam means is in contact with said pusher.

3. A device as claimed in claim 1 wherein said cyclicly movable means includes a drive telescopic shaft carrying the casing and a spring-loaded pusher rigidly connected to said casing wherein said cam means is in contact with said pusher.

* * * * *